United States Patent Office 3,080,412
Patented Mar. 5, 1963

3,080,412
BORATE ESTERS OF GLYCOL MONOETHERS
David Matheson Young, Sarnia, Ontario, Canada, assignor to The Dow Chemical Company, Midland, Mich., a corporation of Delaware
No Drawing. Filed Feb. 18, 1960, Ser. No. 9,419
Claims priority, application Canada Mar. 31, 1959
5 Claims. (Cl. 260—462)

This invention relates to organic chemical compounds, specifically borate esters of glycol monoethers, to a method for the preparation of these compounds, and to a method of drying gases using borate esters.

The novel borate esters of the present invention have the formula:

$$\{R[O-(CH_2)_x]_y-O\}_3-B$$

wherein $x$ is an integer from 2 to 4, $y$ is an integer from 1 to 4, R is a lower alkyl radical containing from 1 to 4 carbon atoms, and B is the boron atom.

The compounds of the present invention are useful as liquid desiccants for drying gases and as stabilizers and corrosion inhibitors for lubricants and non-aqueous hydraulic fluids, especially those based on glycols, polyglycols and the mono- and dialkyl ethers of glycols and polyglycols.

The novel borate esters are essentially non-volatile, water-white liquids and are slightly more viscous than the parent glycol monoethers, in which they are soluble in all proportions. Upon hydrolysis, the novel borate esters yield boric acid and the parent glycol monoether. The esters have very high boiling points and are extremely stable at elevated temperatures.

Starting materials for the preparation of the novel borate esters of the present invention are glycol monoethers having the general formula:

$$R[O-(CH_2)_x]_y-OH$$

wherein R is a lower alkyl radical containing from 1 to 4 carbon atoms, $x$ is an integer from 2 to 4, and $y$ is an integer from 1 to 4.

The glycol monoether is reacted with a boron-containing compound and water removed from the reaction mixture to obtain the compounds of the present invention. In a preferred method of operation, a boric acid or anhydride is used and a water-azeotrope-forming solvent is added to the reaction flask and the water resulting from the esterification removed therefrom in the form of an azeotrope. The temperature of the reaction mixture is initially maintained preferably between about 0° C. and about 200° C., desirably, at the distillation temperature of the water-solvent azeotrope. After essentially complete removal of the water from the reaction mixture, the reaction temperature rises sharply to the boiling point of the pure solvent, where the excess solvent is conveniently removed from the reaction mixture by distillation. The borate ester is left as a residue which frequently may be then distilled off under reduced pressure after removal of any excess glycol monoether. Alternatively, the azeotrope-forming solvent may be omitted from the original reactant system and the reaction mixture fractionally distilled to remove water and excess glycol monoether. Thereafter, the distillation temperature is increased, and the borate ester distilled off. Reduced pressure can be employed and if sufficiently low, the distillation usually can be carried out at moderate temperatures.

Boron-containing compounds which are suitable as starting materials for the preparation of the novel boron esters include, for example, boron acetate, methyl borate and other lower boric acid esters, orthoboric acid, metaboric acid, boric oxide, and the like. Although the boron-containing compound may be any one of several previously mentioned, orthoboric acid, metaboric acid, and boric oxide are the least expensive of the group and are thus preferred. Ethylbenzene was used as the azeotrope-forming solvent in the specific embodiments described herein; however, other relatively high-boiling solvents may be employed, provided that they are inert and form azeotropes with water, such as, for example, benzene, toluene, xylene, diethylbenzene, mesitylene, and the like. The glycol monoethers used as starting materials have the general formula:

$$R[O-(CH_2)_x]_y-OH$$

wherein $x$ is an integer from 2 to 4 and $y$ is an integer from 1 to 4, and R is a lower alkyl group containing from 1 to 4 carbon atoms. Most of these glycol monoethers are commercially available, such as, for example, ethylene glycol monomethyl ether, ethylene glycol monoethyl ether, ethylene glycol mono-n-butyl ether, diethylene glycol monomethyl ether, diethylene glycol monoethyl ether, diethylene glycol mono-n-butyl ether, propylene glycol monomethyl ether, dipropylene glycol monomethyl ether, tripropylene glycol monomethyl ether, triethylene glycol monomethyl ether, triethylene glycol mono-n-butyl ether, butylene glycol monomethyl ether, butylene glycol mono-n-propyl ether, butylene glycol mono-n-butyl ether, and the like.

A mole ratio of approximately 4 to 1 glycol monoether to orthoboric acid is employed, although ratios from 6 to 1 to 1 to 1 may be employed.

The following examples are given to illustrate the present invention, but are not to be construed as limiting the invention thereto.

EXAMPLE I

Two-hundred-thirty-six (236) grams (2.0 moles) of 2-n-butoxyethanol, 41 grams (0.67 mole) of orthoboric acid and 700 milliliters of ethylbenzene were mixed together and heated so that the water-ethylbenzene azeotrope was distilled at 94° C. Esterification was completed in about thirty (30) minutes, as shown by the rise in vapor temperature to 136° C., the boiling point of pure ethylbenzene. After the excess ethylbenzene had been removed, the ester was distilled under pressure of less than 1 millimeter of mercury, absolute. There were thus obtained 160 grams (66 percent of the theoretical yield) of tris(2-n-butoxyethyl)borate, a water-white liquid boiling at 161°–163° C. at a pressure of 0.7 mm. The infra-red spectrum revealed an intense absorption in the range of 6.7 to 7.6 microns, the region characteristic of boric acid esters.

*Analysis.*—Calculated: B, 2.99 percent. Found: 3.09.

EXAMPLE II

In a manner similar to that in Example I, 268 grams (2.0 moles) of 2-(2-ethoxyethoxy)ethanol, 41 grams (0.67 mole) of orthoboric acid and 700 milliliters of ethylbenzene were mixed and heated to yield 198 grams (72 percent of the theoretical) of tris[2-(2-ethoxyethoxy)ethyl] borate, a water-white liquid boiling at 222°–223° C. at a pressure of 5 mm. An intense infra-red absorption was detected in the region of 6.7 to 7.6 microns.

*Analysis.*—Calculated: B, 2.64 percent. Found: 2.70.

EXAMPLE III

In a manner similar to that in Examples I and II, 296 grams (2.0 moles) of 1(1-methoxy-2-propoxy)-2-propanol, (dipropylene glycol monomethyl ether), 41 grams (0.67 mole) of orthoboric acid and 800 milliliters of ethylbenzene were mixed and heated to yield tris[1(1-methoxy-2-propoxy)-2-propyl] borate, a water-white liquid boiling at 183°–184° C. at a pressure of 2 mm. An intense infra-red absorption was detected in the region of 6.8 to 7.7 microns.

*Analysis.*—Calculated: B, 2.39 percent. Found: 2.40.

EXAMPLE IV

A mixture of 250 grams (2.78 moles) of 1-methoxy-2-propanol and 38 grams (0.62 mole) of orthoboric acid was fractionally distilled at atmospheric pressure. After all of the water and excess 1-methoxy-2-propanol had distilled, the pressure was reduced and the product boiling in the range of 125°–128° C. at a pressure of 15 mm. was collected. There were obtained 127 grams of water-white tris(1-methoxy-2-propyl) borate representing a 74 percent yield based on the weight of orthoboric acid used.

*Analysis.*—Calculated: B, 3.89 percent. Found: 3.72.

While the above examples have specifically shown orthoboric acid as a starting material, other boron compounds are suitable and include, for example, boron acetate, methyl borate and other lower boric acid esters, metaboric acid, boric oxide, and the like.

Also, other glycol monoethers, such as, for example, ethylene glycol monomethyl ether, ethylene glycol monoethyl ether, diethylene glycol monomethyl ether, diethylene glycol mono-n-butyl ether, tripropylene glycol monomethyl ether, triethylene glycol monomethyl ether, triethylene glycol mono-n-butyl ether, butylene glycol monomethyl ether, butylene glycol mono-n-propyl ether, butylene glycol mono-n-butyl ether, and the like, may be substituted for the monoethers specifically shown.

The compounds of the present invention have proven utility as liquid desiccants for drying gases. They react with the water in the moist gas as follows:

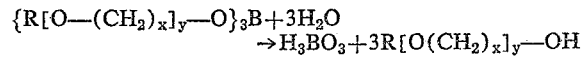

Among the liquid desiccants used commercially for drying gases are glycols, glycerol, ethanolamines, concentrated aqueous solutions of sodium and potassium hydroxides, sulphuric acid, calcium chloride, lithium chloride, and the like. These compounds are all effective in removing the bulk of the moisture from gases but do not reduce the moisture content to as low a level as do borate esters. The compounds of the present invention, for example, reduce the moisture content of nitrogen and of air to an extremely low level, usually about 20 p.p.m.

Hereafter, in this specification the term "moist stream of gaseous material" refers to a gaseous stream containing at least about 40 parts per million by weight of water vapor as the gaseous stream enters the zone of contact with the borate ester. The borate esters are useful for dehydrating a gas containing about 1,000 p.p.m. by weight of water, still more useful when the gas contains about 400 p.p.m. water by weight, and particularly useful when the gas contains about 40 p.p.m. by weight of water.

A method for utilizing the desiccant property of borate esters is that in which a gas partly dehydrated by known liquid desiccants is passed counter-currently through a moving stream of a borate ester in a contact chamber, thereby reducing the moisture content of the gas to an extremely low level and conducting the dehydrated gas out of the contact chamber and to a distribution or storage center. The reaction mixture of borate ester, alcohol, and boric acid is pumped to a regeneration or stripping still, where upon heating to a suitable temperature and removal of water, the borate ester is regenerated and is then returned to the original contact chamber (usually referred to as the contactor or absorber) and the cyclic process repeated.

Any borate ester is within the scope of the invention provided that the ester is a liquid at the temperature of the contact process, and provided further that the gas to be dried does not react chemically with the ester.

The temperature in the contact chamber must be maintained such that the borate ester does not become excessively viscous and the borate ester and the alcohol produced by the dehydration process do not become excessively volatile. The contact temperature is normally maintained preferably between 30°–100° F.

Although nitrogen and air were the gases employed in the examples described herein, any gas which does not react chemically with the borate ester is within the scope of the present invention, such as, for example, oxygen, hydrogen, carbon monoxide, carbon dioxide, helium, argon, methane, ethane, ethylene, acetylene, propane, propylene, butane, butylene, butadiene, methyl acetylene, and the like.

The following examples are given to illustrate the use of borate esters for dehydration but are not to be construed as limiting the invention thereto.

EXAMPLE V

A specially designed 10 milliliter fritted glass gas-washing bottle was filled with 5 milliliters of vacuum-distilled tris(o-cresyl) orthoborate in a dry box. "Dry" nitrogen containing approximately 40 p.p.m. by weight of water was passed from a cylinder and bubbled through the borate at a rate of approximately 0.5 standard cubic feet per hour, the effluent gas was being led through a trap immersed in liquid nitrogen and then to a wet test meter. The various components of the train were joined by short sections of rubber pressure tubing. After passing nitrogen through the train overnight the wet test meter was read and the water that had condensed in the cold trap was determined by the Karl Fischer titration method using methanol as the solvent. The water content of the effluent nitrogen after treatment with the ester was calculated; duplicate experiments showed the water concentration to be 12 parts per million and 14 parts per million.

EXAMPLES VI–XI

The same experiment was repeated, in a manner similar to that in Example V using tris(o-cresyl) orthoborate in which varying known amounts of water had been added. The results are shown on the accompanying table in which the percent water which had been absorbed by the borate and converted into an equivalent amount of o-cresol is related to the water content of the effluent nitrogen stream in parts per million.

*Table*

| Percent Water, by Weight, Converted to O-Cresol | P.p.m. Water, by Weight, in Effluent Nitrogen |
|---|---|
| 0.1 | 13 |
| 1.3 | 27 |
| 2.2 | 46 |
| 4.4 | 120 |
| 9.7 | 3,500 |

EXAMPLE XII

Undiluted tris(o-cresyl) orthoborate was contacted with nitrogen from a cylinder containing approximately 40 p.p.m. by weight of water, as described in Examples V–XI. However, the effluent nitrogen was passed through an accurately weighed Schwarz tube cooled to −195° C. The total water condensed in the tube was determined by weighing the tube and deducting the amount of o-cresol as estimated by ultraviolet spectrophotometry from the gained weight. The effluent stream from the bottle containing the borate was found to contain 21 parts per million of water.

EXAMPLES XIII–XVII

The examples which follow relate to proposed experiments known to be feasible due to the desiccant property of o-cresyl borate.

In each of five separate experiments, a measured volume of air containing a known amount of moisture is passed through 100 pounds of o-cresyl borate until a given amount of water is absorbed by the borate. The water content of the effluent air can then be determined in each case and the percent of water removed by the borate can be determined.

| Lbs. Water Absorbed by 100 lbs. Borate | Volume of Air (s.c.f.) 100 lbs. Borate | Water Content of Influent air (p.p.m.) | Water Content of Effluent Air (p.p.m.)[1] | Percent Water Content Removed from Air |
|---|---|---|---|---|
| 1 | 13,800 | 1,000 | 23 | 98 |
| 1 | 165,000 | 100 | 23 | 82 |
| 2 | 27,800 | 1,000 | 41 | 97 |
| 2 | 370,000 | 100 | 41 | 73 |
| 5 | 77,000 | 1,000 | 230 | 88 |

[1] Concentration of water in effluent stream at end of run.

Various modifications may be made in the present invention without departing from the spirit or scope thereof, and it is to be understood that I limit myself only as defined in the appended claims.

I claim:
1. Organic compounds having the general formula:

$$\{R[O\!-\!(CH_2)_x]_y\!-\!O\}_3\!-\!B$$

wherein B is a boron atom, R is a lower alkyl radical containing from 1 to 4 carbon atoms, $x$ is an integer from 2 to 4, and $y$ is an integer from 2 to 4.
2. Tris[2-(2-ethoxyethoxy)ethyl]borate.
3. Tris[1(1-methoxy-2-propoxy)-2-propyl]borate.
4. A method for preparing tris[2-(2-ethoxyethoxy)- ethyl]borate which comprises reacting, at a temperature of between about 50° and about 200° C., 2-(2-ethoxyethoxy)ethanol with orthoboric acid, removing the water thus formed and separating the resulting tris[2-(2-ethoxyethoxy)ethyl]borate from the reaction mixture.
5. A method for preparing tris[1(1-methoxy-2-propoxy)2-propyl]borate which comprises reacting, at a temperature of between about 50° C. and about 200° C. 1(1-methoxy-2-propoxy)-2-propanol with orthoboric acid, removing the water thus formed and separating the resulting tris[1(1-methoxy-2-propoxy)-2-propyl]borate from the reaction mixture.

References Cited in the file of this patent
UNITED STATES PATENTS

| 795,679 | Bamberger et al. | July 25, 1905 |
| 2,133,334 | Rosset | Oct. 18, 1938 |
| 2,866,811 | Irish et al. | Dec. 30, 1958 |
| 2,961,459 | Spike | Nov. 22, 1960 |

OTHER REFERENCES

Scattergood et al.: J. Am. Chem. Soc., vol. 67, pages 2150 to 2152 (1945).

Lappert: Chemical Reviews, vol. 56, pages 963 to 967 and 971 (1956).